United States Patent
Hafner et al.

(10) Patent No.: US 12,523,305 B2
(45) Date of Patent: Jan. 13, 2026

(54) BALL VALVE, IN PARTICULAR FOR EXPLOSION ISOLATION IN PROCESS PIPELINES

(71) Applicant: Rico Sicherheitstechnik AG, Herisau (CH)

(72) Inventors: Roland Hafner, Uzwil (CH); Jürgen Kern, Weinfelden (CH); Aleksandar Agatonovic, Uzwil (CH); Daniel Zellweger, Gais (CH); Mario Allgäuer, Sirnach (CH)

(73) Assignee: RICO SICHERHEITSTECHNIK AG, Herisau (CH)

( * ) Notice: Subject to any disclaimer, the term of this patent is extended or adjusted under 35 U.S.C. 154(b) by 0 days.

(21) Appl. No.: 18/702,894

(22) PCT Filed: Sep. 1, 2022

(86) PCT No.: PCT/EP2022/074296
§ 371 (c)(1),
(2) Date: Apr. 19, 2024

(87) PCT Pub. No.: WO2023/066558
PCT Pub. Date: Apr. 27, 2023

(65) Prior Publication Data
US 2024/0410474 A1    Dec. 12, 2024

(30) Foreign Application Priority Data

Oct. 21, 2021    (DE) ............... 10 2021 211 893.3

(51) Int. Cl.
*F16K 5/06* (2006.01)
*F16K 5/08* (2006.01)
*F16K 27/06* (2006.01)

(52) U.S. Cl.
CPC .......... *F16K 5/0605* (2013.01); *F16K 5/0647* (2013.01); *F16K 5/0663* (2013.01); *F16K 5/08* (2013.01); *F16K 27/067* (2013.01)

(58) Field of Classification Search
CPC .... F16K 5/0605; F16K 5/0647; F16K 5/0663; F16K 5/08; F16K 27/067
(Continued)

(56) References Cited

U.S. PATENT DOCUMENTS

| | | | | |
|---|---|---|---|---|
| 561,989 A | * | 6/1896 | Harrison | .................... F16K 5/08 251/192 |
| 1,906,266 A | * | 5/1933 | Hoffman | ................. F16K 5/201 251/366 |

(Continued)

FOREIGN PATENT DOCUMENTS

| | | |
|---|---|---|
| CN | 208252809 U | 12/2018 |
| CN | 211288891 U | 8/2020 |

(Continued)

*Primary Examiner* — John Bastianelli
(74) *Attorney, Agent, or Firm* — McGlew and Tuttle, P.C.

(57) ABSTRACT

A ball valve is configured for explosion isolation in process pipelines and includes a housing pipe (2) coaxial with the through-flow direction (F). Bearing rings (6, 7) are flanged respectively onto the end faces (3, 4) of the housing pipe and have bearing shoulders (29) that engage in the internal opening of the housing pipe. A valve body (14), having a ball ring shape having a continuous through-flow opening (15), mounted between the bearing shoulders (29) via sealing rings (27, 28) inserted therein so as to be driven in rotation about an axis of rotation (D), extending perpendicularly to the through-flow direction (F), between a respectively stopped closed and open position, a rotary drive for the valve body (14), and stop recesses (18, 19) which are formed directly in the valve body (14) and form end stops (22, 23)

(Continued)

for stop protrusions (24, 25) on the housing pipe (2) in order to define the closed and open position of the valve body (14).

10 Claims, 12 Drawing Sheets

(58) Field of Classification Search
USPC .................. 251/315.01–315.16, 286–288
See application file for complete search history.

(56) References Cited

U.S. PATENT DOCUMENTS

| | | |
|---|---|---|
| 3,179,121 A | 4/1965 | Bredtschneider et al. |
| 3,226,080 A | 12/1965 | Lowrey |
| 3,348,804 A | 10/1967 | Piccardo |
| 3,737,145 A | 6/1973 | Heller et al. |
| 4,867,414 A | 9/1989 | Hubacek |
| 9,625,039 B2 | 4/2017 | Endt et al. |
| 10,030,784 B2 | 7/2018 | Lanning |
| 2022/0252176 A1* | 8/2022 | Netzer .................. F16K 5/0605 |

FOREIGN PATENT DOCUMENTS

| | | |
|---|---|---|
| DE | 202016106129 U1 | 11/2016 |
| DE | 102019112559 A1 | 11/2020 |
| JP | H11304016 A | 11/1999 |
| WO | 2015128058 A1 | 9/2015 |

* cited by examiner

BALL VALVE, IN PARTICULAR FOR EXPLOSION ISOLATION IN PROCESS PIPELINES

CROSS-REFERENCES TO RELATED APPLICATIONS

This application claims the priority, under 35 U.S.C. § 119, of German Patent Application, Serial No. DE 10 2021 211 893.3, filed Oct. 21, 2021, the content of which is incorporated herein by reference in its entirety as if fully set forth herein.

FIELD OF THE INVENTION

The invention relates to a ball valve which is also to be used in particular for explosion isolation in process pipelines.

BACKGROUND OF THE INVENTION

With regard to the background to the invention, it should be noted that slide valves, non-return valves or quench systems are usually used for explosion isolation in process systems. For the application of pneumatic conveying systems, such as those used for filling silos, such protective devices are problematic with regard to abrasion and product deposits.

Ball valve arrangements for use as explosion protection elements are generally known from the prior art. For example, CN 211 288 891 U discloses a ball valve for a gas pipe with an automatic closing function with explosion protection. The ball valve has a connection pipe that runs inside a valve pipe and is significantly smaller in diameter. If the gas ignites, the explosion spreads more quickly through the connection pipe and creates an explosion in an elliptical pipe. As a result, the air above the elliptical piston plate is extracted and the piston moves upwards. The piston transmits a rotary movement to the ball body via a threaded rod and closes the ball valve before the explosion reaches it. The ball valve is sealed by rubber seals. The design and function of this well-known ball valve are complex.

CN 208 252 809 U also shows an explosion protection ball valve with a ball body that is automatically closed in the event of a sudden increase in pressure, for example due to the pressure wave of an explosion. In the event of an explosion, the pressure wave propagates into a guide pipe, which comprises a piston. The piston comprises a threaded rod that drives a gear wheel. The gear wheel is in operative connection with the ball body via a shaft. The ball valve comprises a series of limiting blocks that limit one end position of the ball body. This is also a complex design.

U.S. Pat. No. 10,030,784 B2 discloses a ball valve arrangement with a triple seal, which is also complex due to this design. Its ball body is guided by sealing lips.

WO 2015/128 058 A1 shows a ball valve with a valve ball that can shut off a fluid communication between fluid connections, as well as with sensor connections that can read the switching position of the valve ball. The ball valve also has a stop pin which, in conjunction with a cam disc, determines the end positions of the valve ball. The disclosed sensor system means an additional design effort.

Further publications to be mentioned are U.S. Pat. Nos. 3,737,145 A, 3,179,121 A and 4,867,414 A. The first-mentioned publication shows a ball valve with a valve body in whose flattened upper and lower sides recesses are arranged to form ribs. These serve to stiffen the multi-part and non-solid ball valve body. In the ball valve according to U.S. Pat. No. 3,179,121 A, a simple stop for the rotary movement of the valve body is provided on the outside of the valve housing at the bearing of the actuating handle. U.S. Pat. No. 4,867,414 A discloses a ball valve in which stop extensions on the valve body co-operate with circular arc-shaped slots in intermediate plates. This design increases the inertial mass of the valve body and is therefore very unfavorable for an explosion protection application.

SUMMARY OF THE INVENTION

It is an object of the invention to provide a ball valve that can be used universally for normal shut-off and explosion protection purposes, which, while being simple in design, is reduced in its mass inertia to improve the responding behavior in the event of explosion protection.

This object is achieved by a ball valve having the following features:
- a housing pipe coaxial with the through-flow direction,
- bearing rings which are flanged respectively onto the end faces of the housing pipe and have bearing shoulders that engage in the internal opening of the housing pipe,
- a valve body, in a spherical ring shape (also referred to as the basic form of a ball ring) having a through-flow opening, mounted between the bearing shoulders via sealing rings inserted therein so as to be driven in rotation about an axis of rotation, extending perpendicularly to the through-flow direction, between a respectively stopped closed and open position,
- a rotary drive for the valve body, and
- stop recesses which are formed directly in the valve body form end stops for stop protrusions on the housing pipe in order to define the closed and open position of the valve body.

The combination of the above features achieves a good sealing effect with a quick response of the ball valve. As the valve body—in contrast to conventional ball valves—is not supported and sealed via half shells but via the aforementioned sealing rings, an optimum compromise between tightness and the lowest possible frictional forces between the valve body and the seals serving as guides can be achieved by adjusting the bearing rings to the housing pipe via the corresponding fixing screws. Low frictional forces, together with the reduction in mass due to the stop recesses provided in the valve body, lead to a significantly lower inertia of the valve body, which significantly improves its responding behavior in the event of an explosion. Due to the basic design of the ball valve, the stop functional surfaces and also the transmission elements for the drive can be integrated directly into the valve body, meaning that high acceleration forces can also be transmitted.

Preferred further embodiments of the ball valve according to the invention are given hereinafter. For example, the valve body can have external flat surfaces arranged at right angles to its axis of rotation to form a combined spherical ring with upper and lower planer surfaces—a spherical ring segment (or ball-ring/ball-layer form) of the valve body, wherein the stop recesses are formed into the respective flat surfaces. Overall, the configuration of the valve body is thus optimally adapted to the intended use.

According to a preferred embodiment of the invention, the stop recesses have a circular segment-shaped contour, wherein the end stops are formed by the intersection zones between the circular arc edge and the circular chord edge of the stop recesses. The latter are thus particularly well designed for the kinematics of the valve body, which is all the more true if the radius of the circular arc edge corresponds to the distance of the stop protrusions from the axis of rotation in such a manner that the circular arc edge acts as a guide surface during the rotary movement of the valve body. This additional guidance of the valve body benefits the sealing quality of the ball valve as well as the valve body's rotational behavior, which is as uniform as possible.

The variable adjustment of the bearing ring mentioned at the beginning to adjust the pressure applied to the valve body by the sealing rings can be implemented in a particularly elegant design by allowing the bearing rings to be screwed into the housing pipe parallel to the through-flow direction.

The possible one-piece integration of a coupling attachment for connection to the rotary drive of the ball valve in the valve body further reduces the design and manufacturing costs and effort while improving the kinematics.

A preferred embodiment provides flange threaded bores on the outer sides of the bearing rings pointing in the through-flow direction for flanging on a pipeline. The bearing rings thus fulfil an advantageous dual function.

Furthermore, for a stable, in particular explosion-proof design, pivot bearing bases for the valve body and a semi-mounted rotary drive can be arranged in or on the housing pipe of the ball valve.

Alternatives for the rotary drive include a pneumatic drive, in particular a gas generator drive, or an electric drive. Triggering in the event of an explosion can then take place, for example, via a rupture wire of a rupture disc or via a control system including connected sensors.

Further features, details and advantages of the invention are apparent from the following description of an embodiment example with reference to the accompanying drawings.

DESCRIPTION OF THE PREFERRED EMBODIMENT

Figure 1:
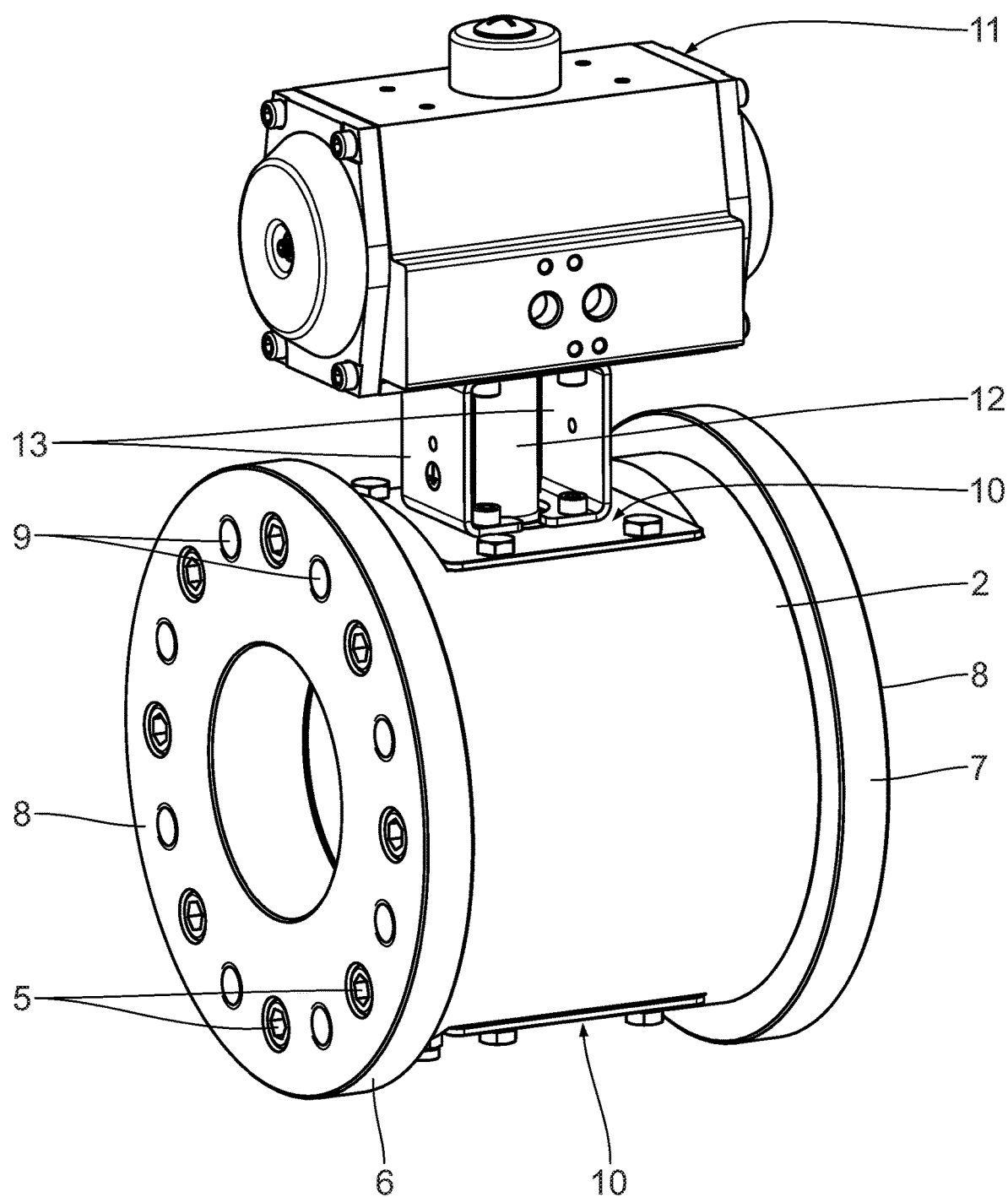
FIG. 1 shows a perspective representation of a ball valve.
Figure 2:
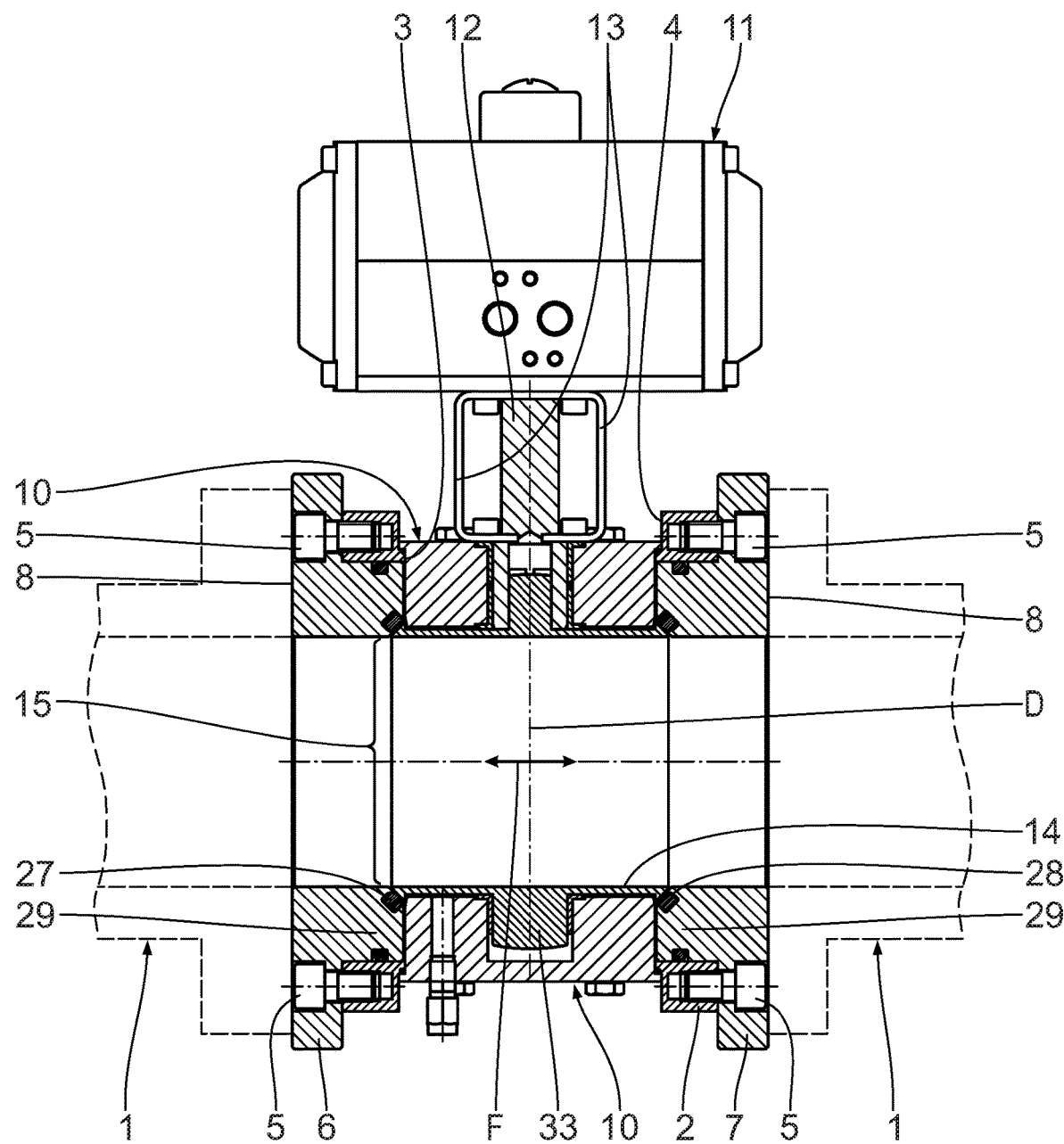
FIG. 2 and FIG. 3 show vertical sections of the ball valve in the through-flow direction and transverse thereto.
Figure 3:
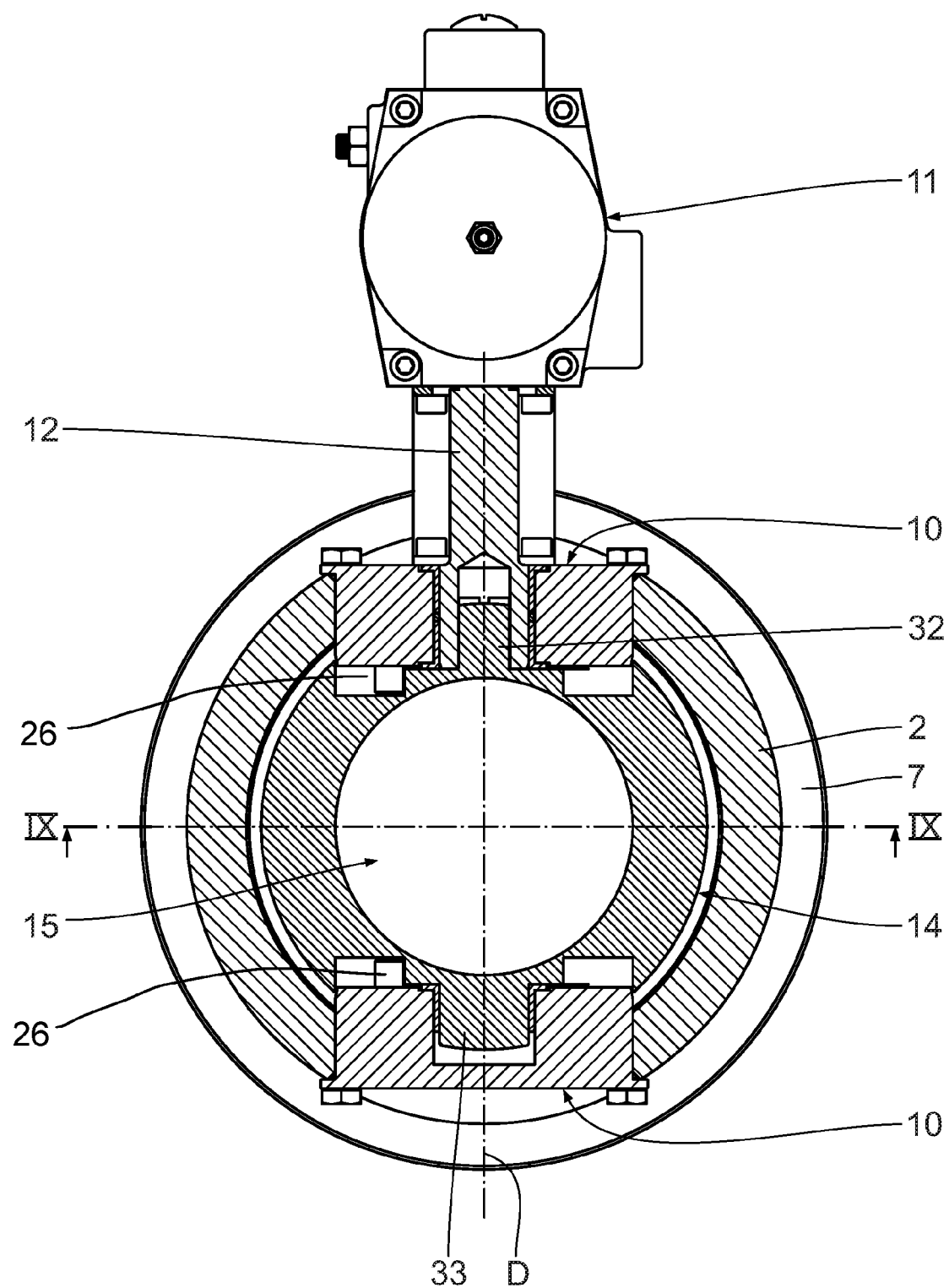
Figure 4:
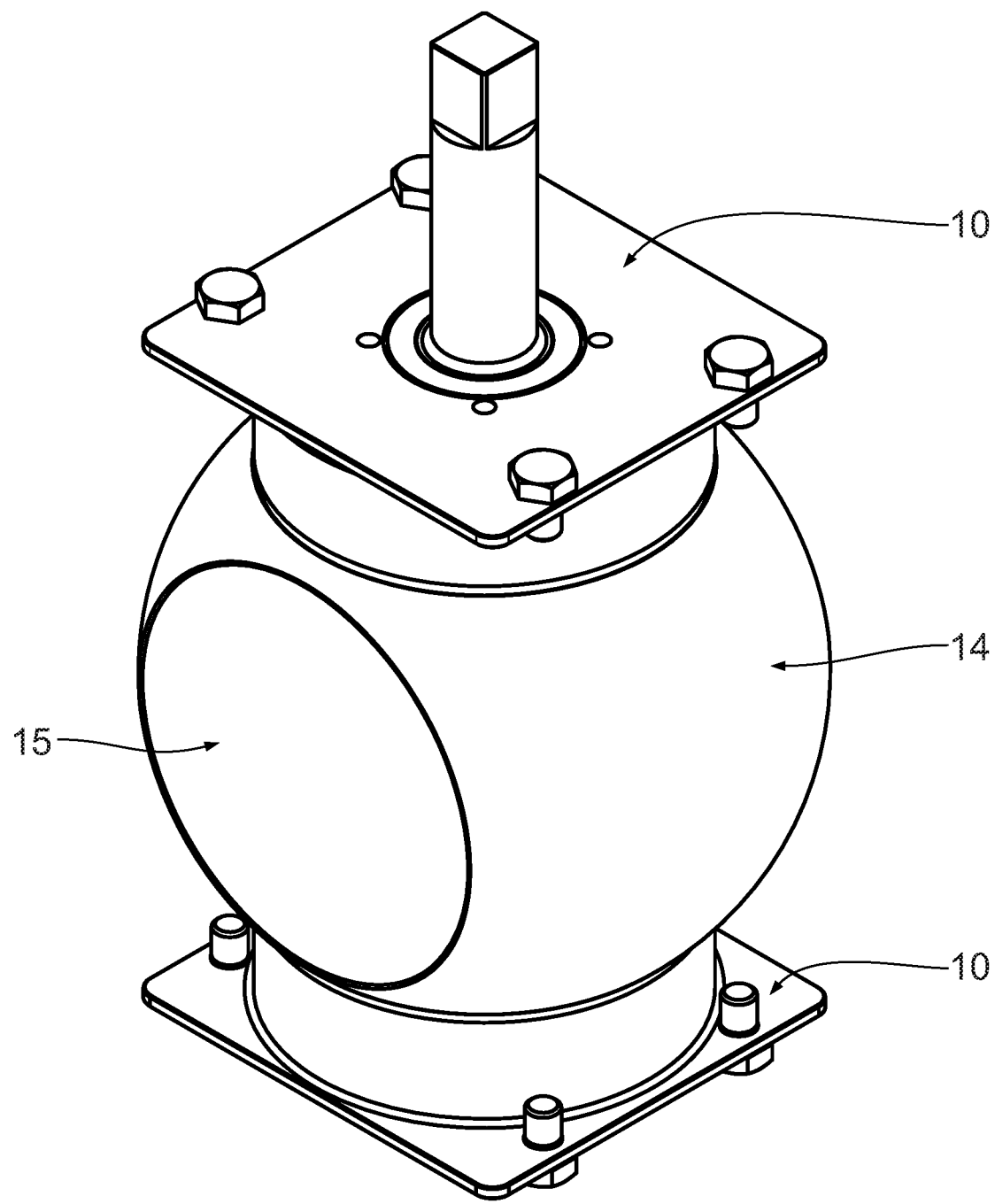
FIG. 4 shows a perspective view of the valve body with associated bearings.

As can be seen from FIGS. 1 to 3, the ball valve shown for explosion isolation in a process pipeline 1 shown dashed in FIG. 2 has a housing pipe 2 that is coaxial to the through-flow direction F, to the end faces 3, 4 of which a bearing ring 6, 7 is attached via fastening screws 5 inserted parallel to the through-flow direction F. The latter have flange threaded bores 9 machined into their outer sides 8 from the outside. The latter have flange threaded bores 9 machined into their outer sides 8 from the outside, via which the process pipeline 1 is screwed to the ball valve.

As can also be seen from FIGS. 1 to 3, a pivot bearing body 10 located at the top of the housing pipe 3 serves as a bearing base for a rotary drive 11 semi-mounted by means of supporting struts 13, which can be activated pneumatically, for example. An event of explosion in the process pipeline 1 is detected by suitable detectors and the rotary drive 11 is actuated accordingly, causing the drive shaft 12 to be abruptly rotated by 90° about the axis of rotation D of the ball valve, as will be explained in more detail later.

As can be seen from FIGS. 2 to 12, the ball valve has a valve body 14, which has the basic shape of a spherical ring with a continuous through-flow opening 15 with the through-flow direction F. The diameter d15 of the through-flow opening 15 corresponds to the free internal diameter d67 of the bearing rings 6 and 7. The diameter d15 of the through-flow opening 15 corresponds to the free inside diameter d67 of the bearing rings 6, 7, so that in the open position of the ball valve—see in particular FIG. 9—a uniformly continuous through-flow opening 15 is formed without undercuts and edges.

Figure 5:
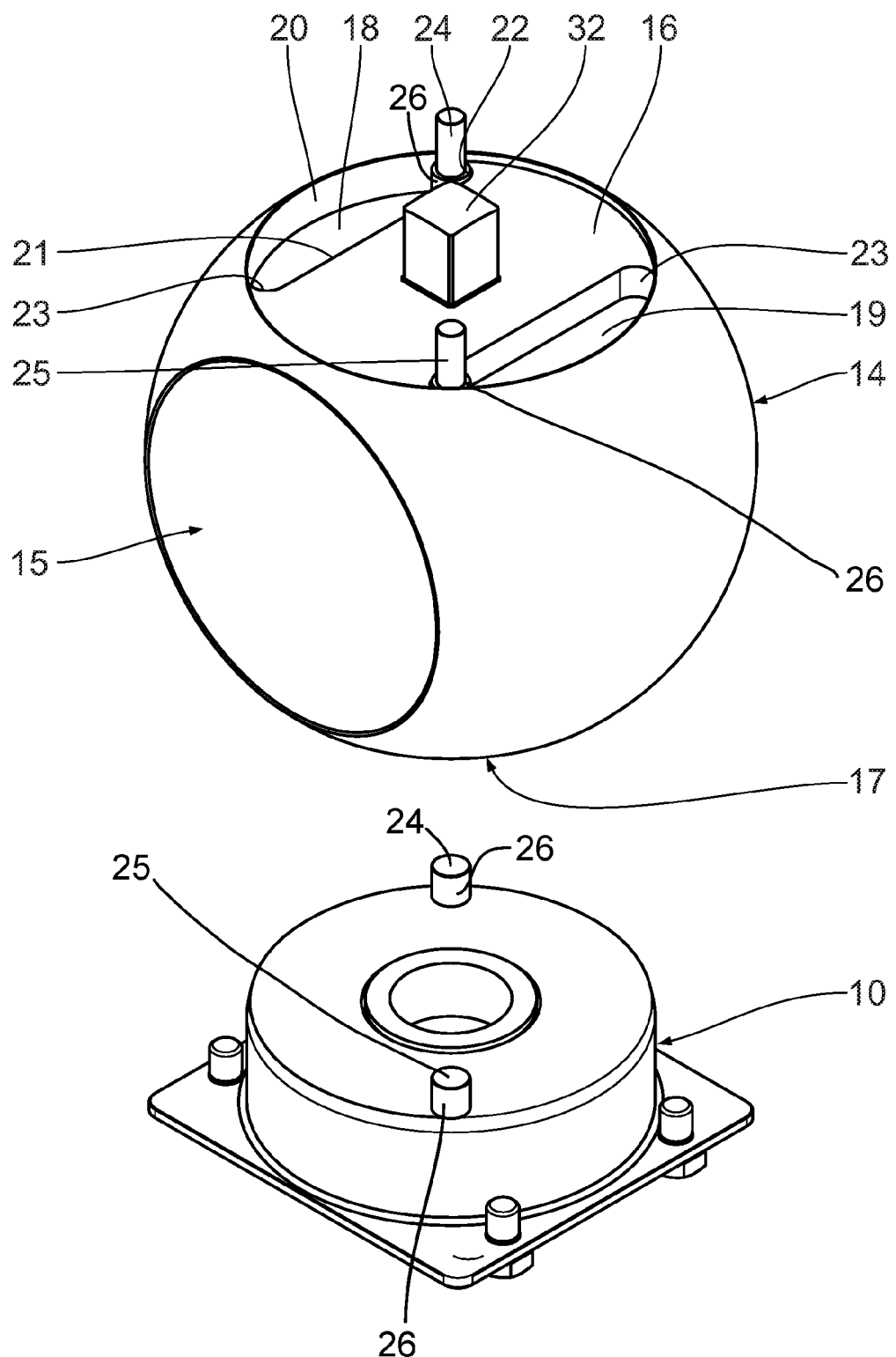
FIG. 5 and FIG. 6 show perspective exploded representations of the valve body including foot-side bearing and stop elements in the open and closed position.
Figure 6:
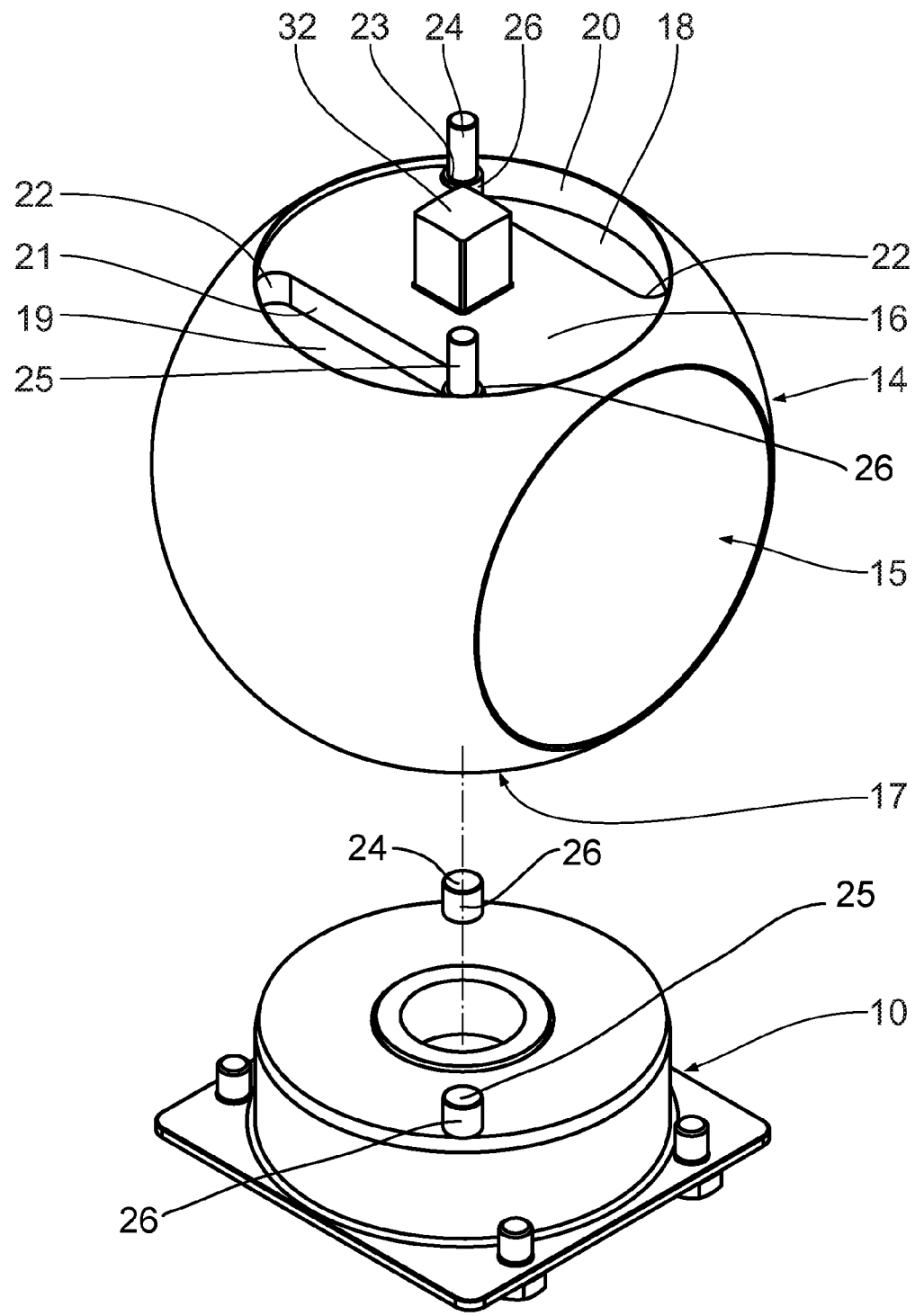
Figure 7:
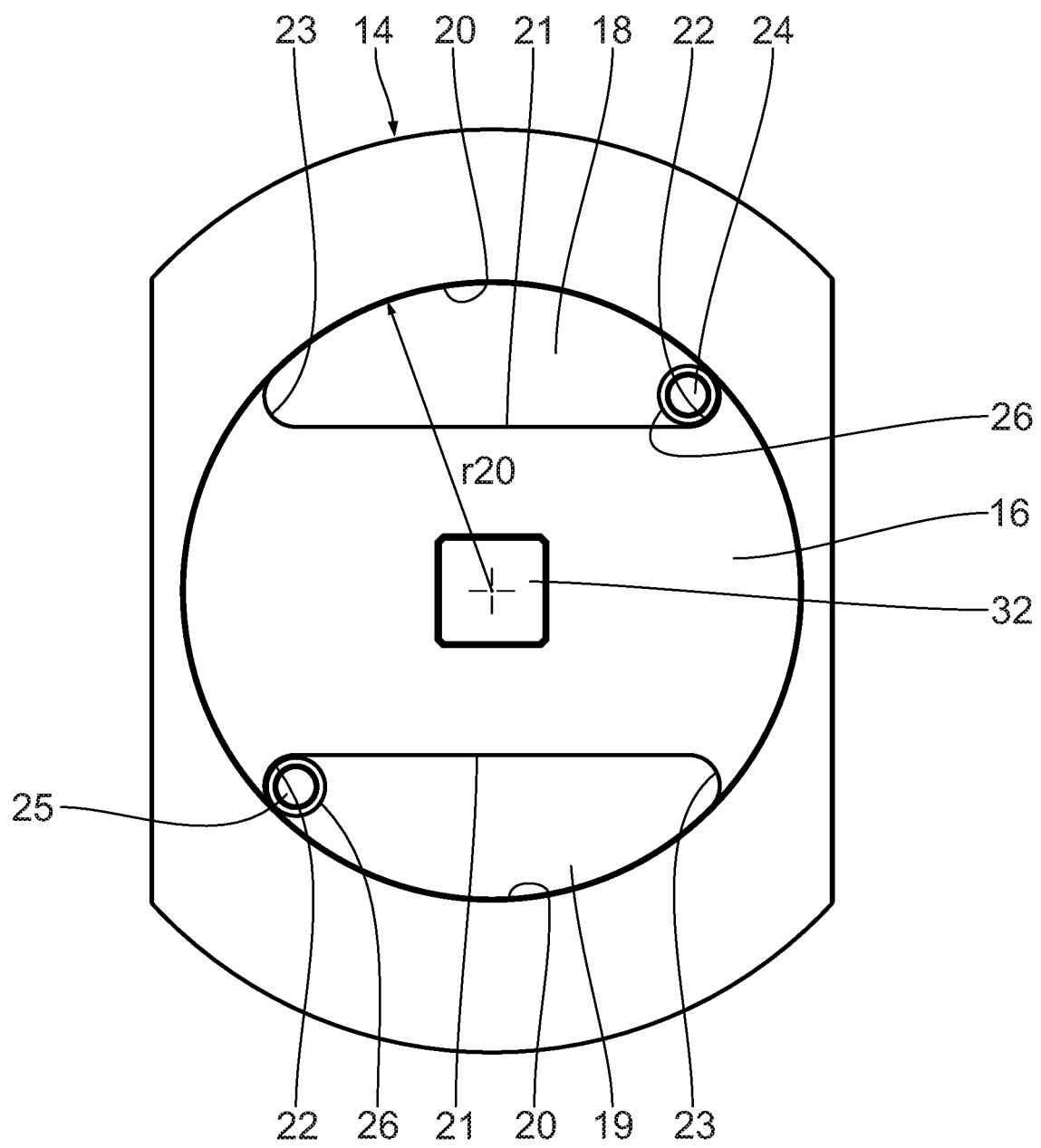
FIG. 7 and FIG. 8 show plan views onto the valve body including stop elements in the open and closed position.
Figure 8:
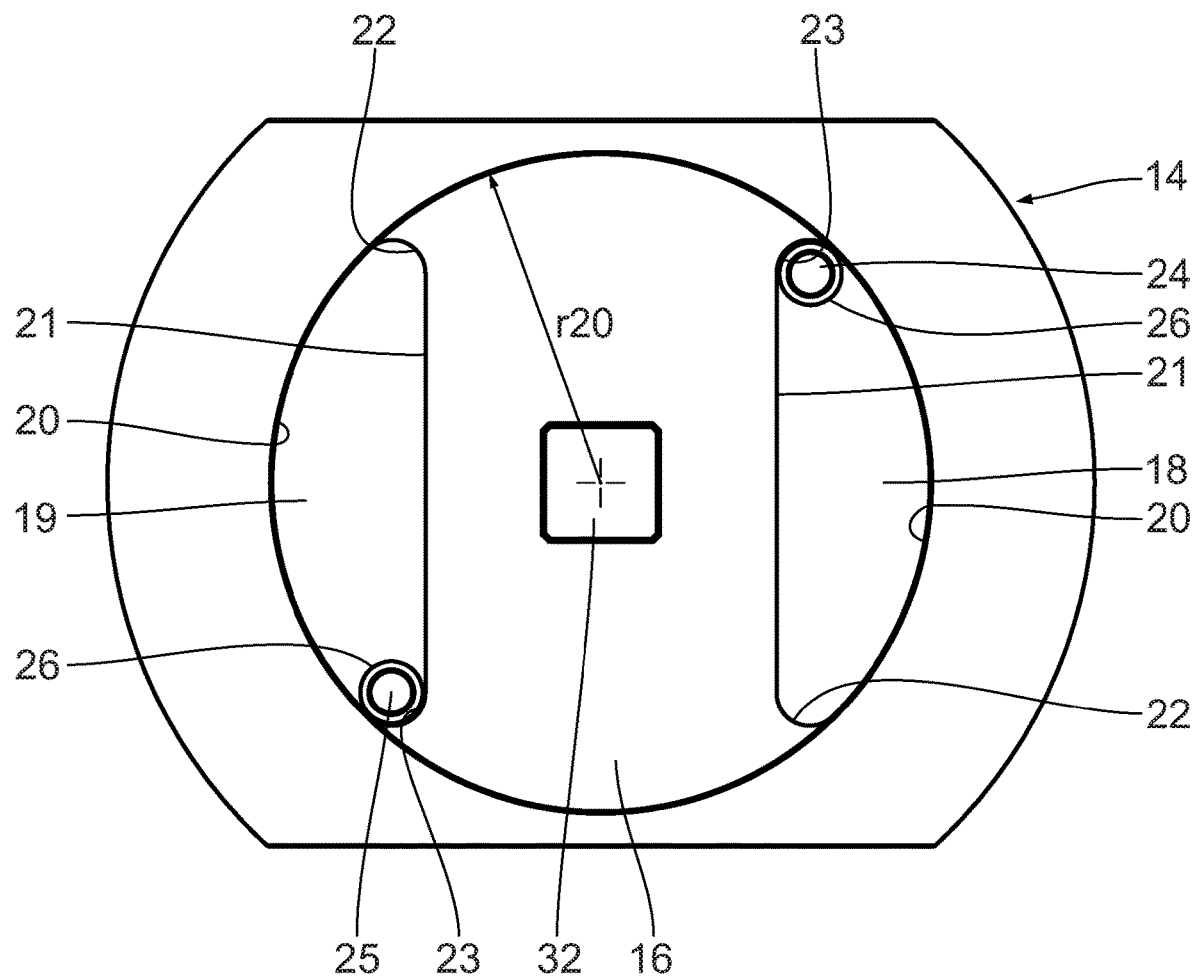
Figure 9:
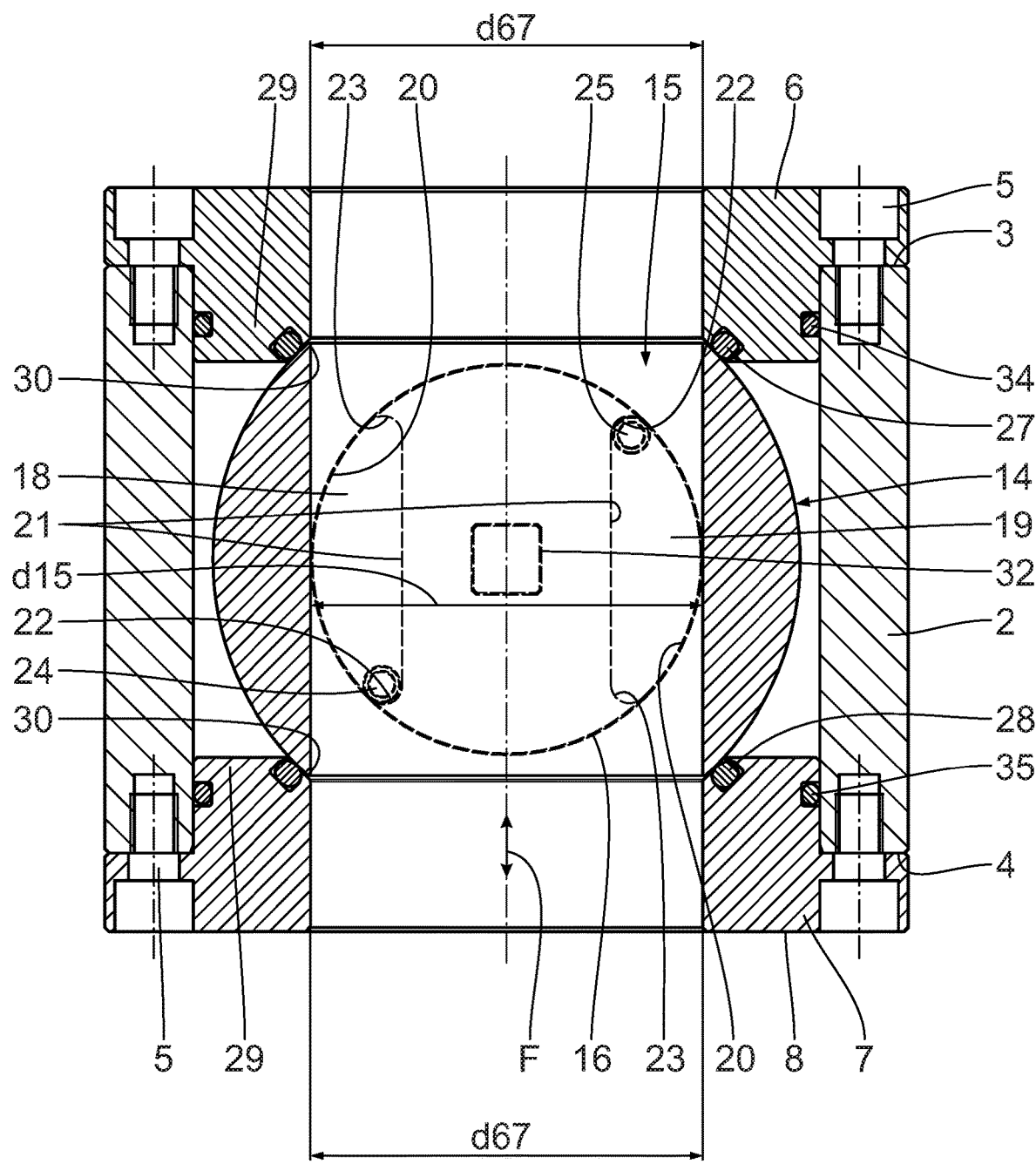
FIG. 9, FIG. 10, FIG. 11 and FIG. 12 show horizontal sections of the ball valve according to section lines IX-XI in FIG. 3 in four rotational positions between the open and closed positions.
Figure 10:
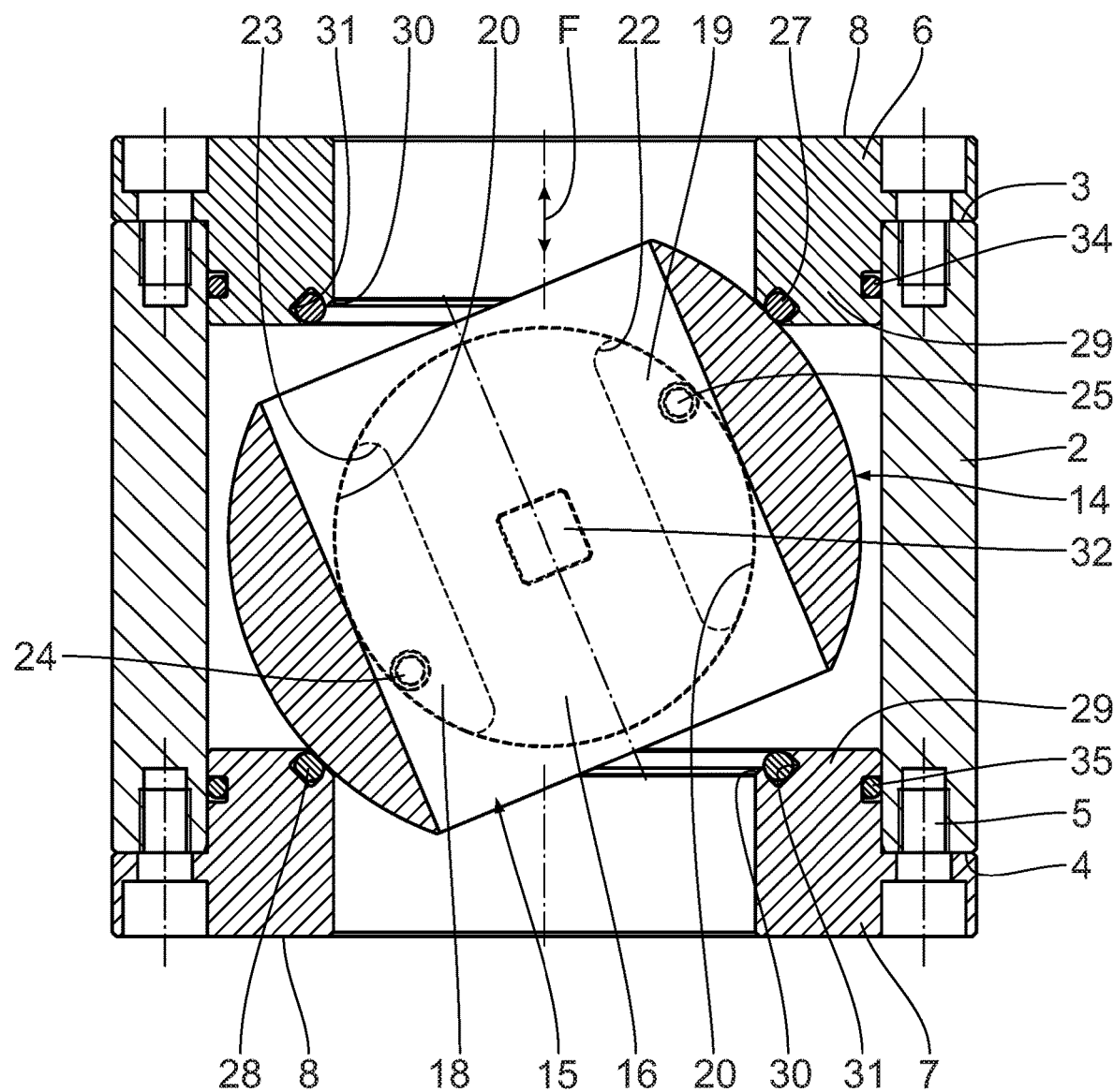
Figure 11:
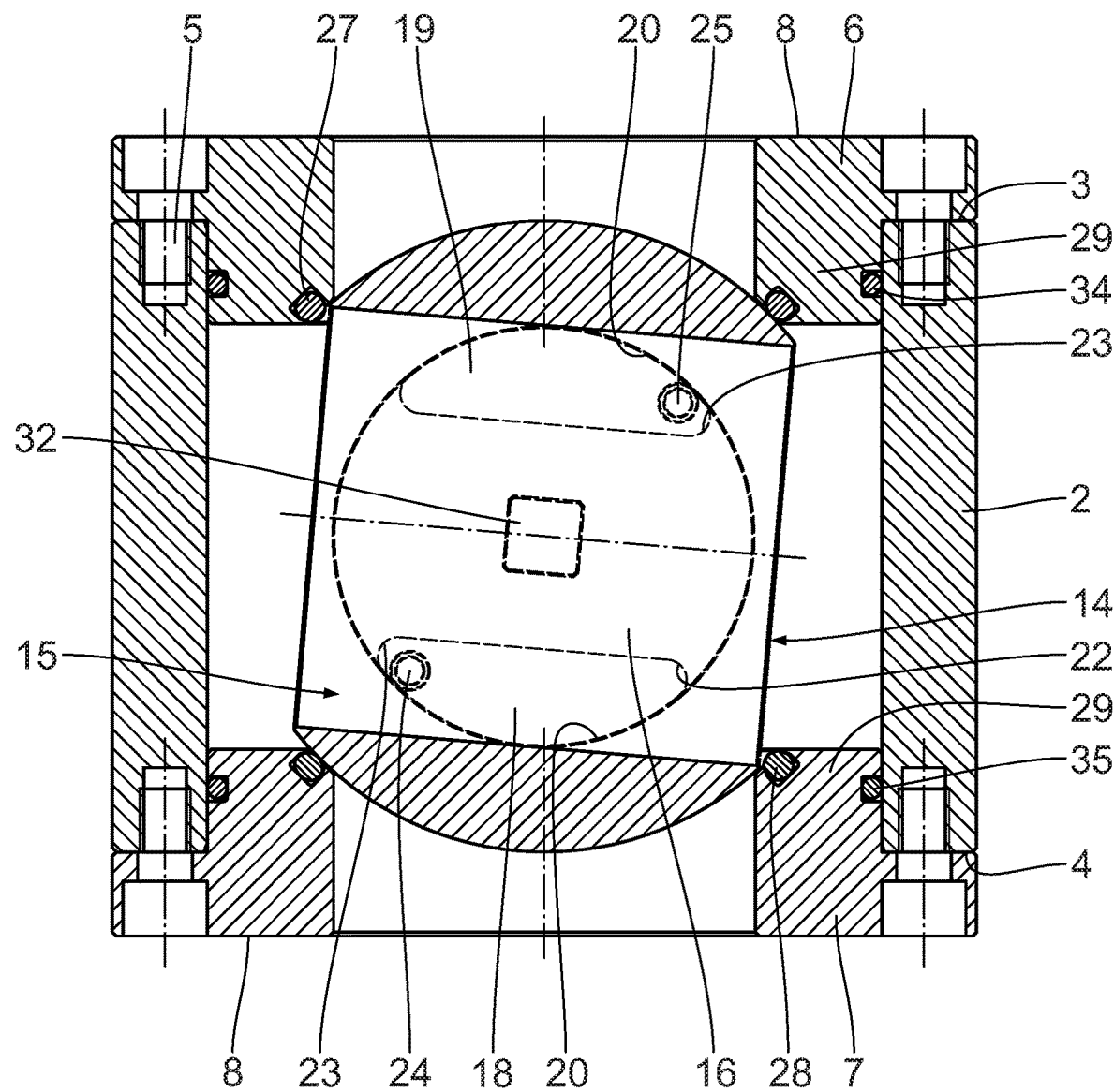
Figure 12:
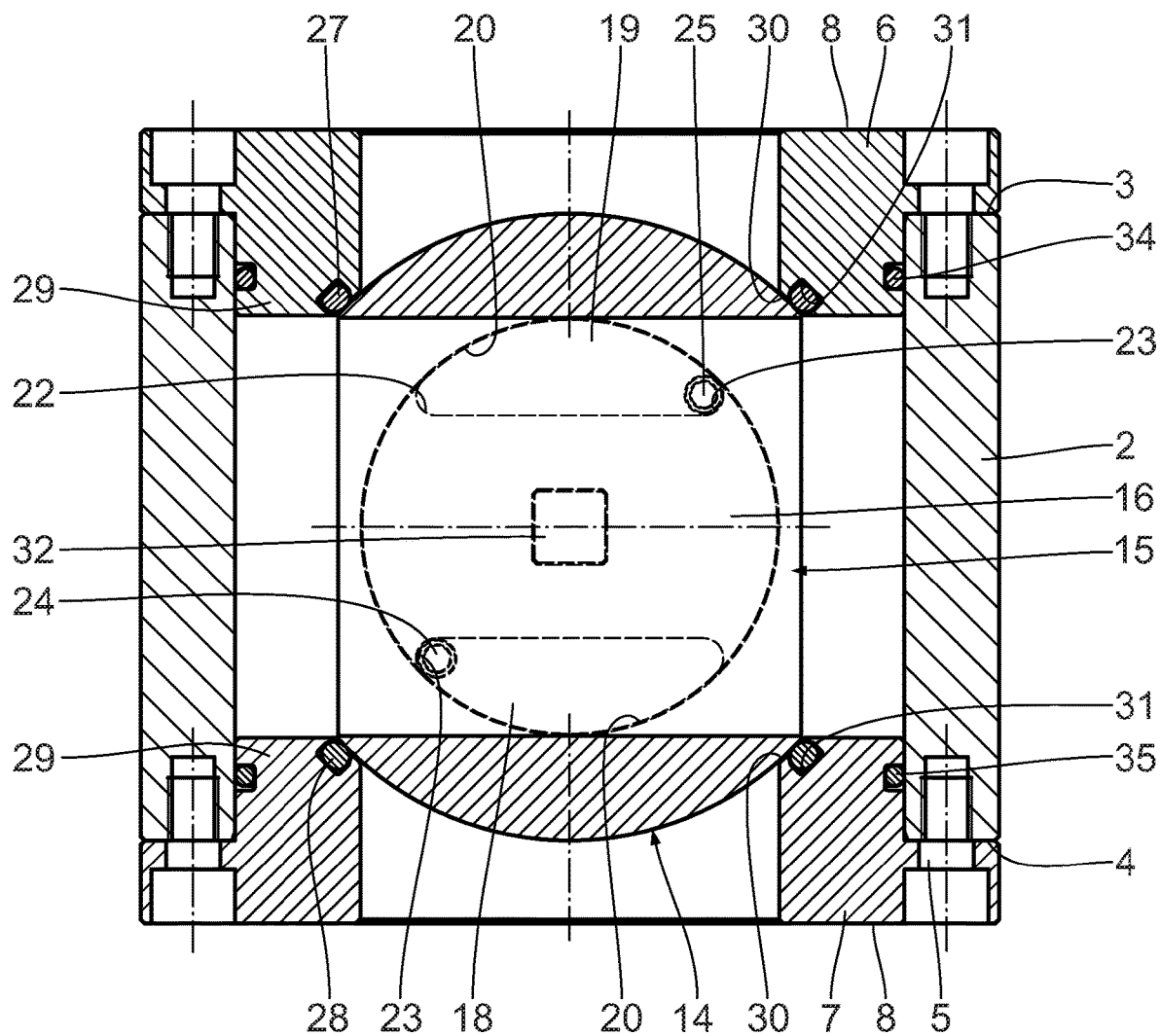

As can be seen from FIGS. 5 to 8, the valve body 14 also has external flat surfaces 16, 17 arranged at right angles to its axis of rotation D at the top and bottom, so that the valve body 14 as a whole takes a combined spherical ring/spherical segment shape (a ball-ring and ball-layer form). Stop recesses 18, 19 with a circular segment shaped contour are formed in one piece into the upper and lower flat surfaces 16, 17, wherein the rounded intersection zones between the circular arc edge 20 and the circular chord edge 21 form end stops 22, 23 respectively, which interact with corresponding stop protrusions 24, 25 on the pivot bearing bodies 10. In FIGS. 5 and 6, only the stop protrusions 24, 25 of the upper pivot body 10 are shown for illustrating their interaction with the stop recesses 18, 19 on the valve body 4. These stop protrusions 24, 25 are covered with damping protection sleeves 26 in order to minimize mechanical overstress and acoustic loads when the explosion protection ball valve is triggered. The radius r20 of the circular arc edge 20 corresponds to the outer distance of the stop protrusions 24, 25 from the axis of rotation D, so that they serve as a guide surface for the rotary movement of the valve body 14, which will be explained later.

As can also be seen from FIGS. 5 to 8, a square-shaped coupling attachment 32 is formed centrally in the flat surface 16, which is in rotationally fixed engagement with a corresponding receptacle (not shown) in the drive shaft 12 for transmitting the drive torque of the rotary drive 11. At the same time, the upper pivot bearing body 10 there contributes to the rotational mounting of the valve body 14. A stub axle 33 (see FIGS. 2 and 3) is formed centrally onto the flat surface 17 opposite the coupling 32 for rotational mounting of the valve body 14 in the lower pivot bearing body 10.

As can be seen in particular from FIGS. 9 to 12, the valve body 14 is installed in the ball valve in a sealed manner by two sealing rings 27, 28 designed as O-rings and is guided by these during the rotary movement. The sealing rings 27, 28 are arranged at the inner end of bearing shoulders 29, with which the bearing rings 6, 7 engage in the internal opening of the housing pipe 2. The sealing rings 27, 28 are each inserted in receiving grooves 31, which are formed in one piece in beveled corner flanks 30 of the bearing shoulders 29. The two sealing rings 27, 28 therefore have a slightly larger diameter than the internal diameter d15 of the through-flow opening 15.

The functional sequence in the ball valve can now be explained with reference to FIGS. 9 to 12. In the open position of the valve body 14 shown in FIG. 9, the through-flow opening 15 is completely open, the sealing rings 27, 28 rest tightly around the through-flow opening 15 between the valve body 14 and the bearing rings 6, 7 and the stop protrusions 24, 25 rest against the end stops 22.

When the ball valve is activated due to an event of explosion, the rotary drive 11 rotates the valve body 14 anti-clockwise with reference to FIGS. 9 to 12 and the spherical dome-shaped outer surface of the valve body 14 slides along the corresponding sections of the sealing rings 27, 28 in a sealing manner. Wherever sections of the sealing rings are located in front of the through-flow opening 15, the sealing effect is naturally absent and is compensated for during the rotary movement of the valve body 14 by the auxiliary sealing rings 34, 35 between the outside of the bearing shoulders 29 and the housing pipe 2. During this rotary movement, the stop protrusions 24, 25 are guided by the circular arc edges 20 of the stop recesses 18, 19, thus stabilizing the rotary movement itself.

At the end of the rotary movement (FIGS. 11 and 12), the sealing ring 27, 28 and the valve body 14 come into sealing engagement with each other again and the stop protrusions 24, 25 abut the end stops 23. The ball valve is thus closed (FIG. 12) and the process pipeline is effectively sealed against the propagation of an explosion wave.

The invention claimed is:

1. A ball valve comprising:
   a housing pipe coaxial to a through-flow direction;
   bearing rings which are flanged respectively onto end faces of the housing pipe and have bearing shoulders that engage in an internal opening of the housing pipe;
   a valve body, with a spherical ring shape, and having a continuous through-flow opening, mounted between the bearing shoulders via sealing rings inserted therein so as to be driven in rotation about an axis of rotation, extending perpendicularly to the through-flow direction, between respectively a stopped closed position and a stopped open position;
   a rotary drive for the valve body; and
   stop recesses which are formed directly in the valve body and form end stops for stop protrusions on the housing pipe in order to define the stopped closed position and the stopped open position of the valve body, wherein the stop recesses have a circular segment-shaped contour, wherein the end stops are formed by intersection zones between a circular arc edge and a circular chord edge of the stop recesses.

2. A ball valve according to claim 1, wherein the spherical ring shape of the valve body comprises a spherical segment that has external planar surfaces arranged at right angles to a valve body axis of rotation, wherein the stop recesses are formed in the respective planar surfaces.

3. A ball valve according to claim 1, wherein a radius of the circular arc edge corresponds to a distance of the stop protrusions from the valve body axis of rotation such that the circular arc edge acts as a guide during rotary movement of the valve body.

4. A ball valve according to claim 1, wherein the bearing rings are configured to be variably screwed into the housing pipe parallel to the through-flow direction.

5. A ball valve according to claim 1, wherein the sealing rings are inserted into receiving grooves which are formed into corner flanks of the bearing rings that are beveled towards the valve body.

6. A ball valve according to claim 1, wherein the valve body is provided with at least one coupling attachment formed in one piece for connection to the rotary drive of the ball valve.

7. A ball valve according to claim 1, wherein the bearing rings comprise flanges perpendicular to the through-flow direction that are provided with flange threaded bores on a respective flange outer side, pointing in the through-flow direction for flange-mounting a pipeline.

8. A ball valve according to claim 1, wherein pivot bearing bodies for the valve body and a semi-mounted rotary drive are arranged one of in and on the housing pipe.

9. A ball valve according to claim 1, wherein the rotary drive is designed as one selected from the group comprising a pneumatic, an electric drive and a gas generator drive.

10. The ball valve according to claim 1, wherein the ball valve is configured for explosion isolation in process pipelines.

* * * * *